United States Patent
Cheng

(10) Patent No.: US 8,155,589 B2
(45) Date of Patent: Apr. 10, 2012

(54) BLUETOOTH DEVICE AND BANDWIDTH MANAGING METHOD THEREOF

(75) Inventor: Kuang-Ting Cheng, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1115 days.

(21) Appl. No.: 12/018,140

(22) Filed: Jan. 22, 2008

(65) Prior Publication Data

US 2008/0182515 A1    Jul. 31, 2008

(30) Foreign Application Priority Data

Jan. 30, 2007   (TW) ............................. 96103370 A

(51) Int. Cl.
  *H04B 7/00*    (2006.01)

(52) U.S. Cl. .................................... 455/41.2
(58) Field of Classification Search ............... 455/41.2, 455/41.3
See application file for complete search history.

(56) References Cited

U.S. PATENT DOCUMENTS

| 6,718,043 | B1 | 4/2004 | Boesen |
| 6,829,288 | B2 | 12/2004 | Orava |
| 2001/0049276 | A1 | 12/2001 | Beck et al. |
| 2002/0003792 | A1 | 1/2002 | Schmidl et al. |
| 2002/0172185 | A1* | 11/2002 | Mito et al. ............ 370/347 |

OTHER PUBLICATIONS

"Office Action of Taiwan Counterpart Application", issued on Oct. 29, 2010, p.1-p.4, in which the listed references were cited.

* cited by examiner

*Primary Examiner* — Lewis West
(74) *Attorney, Agent, or Firm* — Jianq Chyun IP Office

(57) ABSTRACT

A Bluetooth device and a bandwidth managing method thereof are disclosed. The Bluetooth device is connected to a remote device by establishing a synchronous connection oriented (SCO) channel. The intensity of the sound signal is monitored. If the intensity of the sound signal is larger than the default value, the slots of the SCO channel are used to transmit the sound value to the remote device. If the intensity of the sound signal is smaller than the default value, the bandwidth occupied by the slots is dynamically released to avoid the waste of the bandwidth.

16 Claims, 3 Drawing Sheets

BLUETOOTH DEVICE AND BANDWIDTH MANAGING METHOD THEREOF

CROSS-REFERENCE TO RELATED APPLICATION

This application claims the priority benefit of Taiwan application serial no. 96103370, filed on Jan. 30, 2007. The entirety of the above-mentioned patent application is hereby incorporated by reference herein and made a part of this specification.

BACKGROUND OF THE INVENTION

1. Field of the Invention

The invention relates to a wireless device and a bandwidth managing method thereof and, more particularly, to a Bluetooth device and a bandwidth managing method thereof.

2. Description of the Related Art

Bluetooth is a wireless communication technology used in a short distance and with a low cost, and it makes a communication in the frequency-hopping spread spectrum (FHSS) mode to reduce interruptions. Since the Bluetooth technology has these advantages, much wired electronic equipment has been developed to be wireless Bluetooth devices such as Bluetooth earphones, Bluetooth microphones, Bluetooth mousse and keyboards and so on in recent years. These Bluetooth devices can transmit information by radio wave among the electronic devices such as computers, mobile phones, personal digital assistants (PDA) and so on.

The Bluetooth technology transmits information between a master and a slave in a time division duplex (TDD) mode, and the data transmission rate can reach 1 Mbps. The Bluetooth technology supports two connecting types. One of them is asynchronous connectionless (ACL) channel, and another is synchronous connection oriented (SCO) channel. The ACL channel is used to transmit data or command, while the SCO channel is used to transmit sound. The master can transmits data to a plurality of slaves, and different master-slave pairs can use different connecting types, but the sum of the bandwidth still has a fixed upper limit.

FIG. 1 is a schematic diagram showing a conventional Bluetooth device. Please refer to FIG. 1. The master 10 is, for example, a mobile phone. The slave 20 is, for example, a Bluetooth earphone. In the conventional technology, before the sound is transmitted under the Bluetooth technology BT1.1, the SCO channel between the master 10 and the slave 20 is established at advance. Fixed slots for transmitting sound signals at fixed time and amount are reserved when the SCO channel is established. Each slot is 625 microsecond. When the master 10 transmits sound signals to the slave 20, the TX slot is used to transmit the sound signals to the slaves 20. On the contrary, when the slave 20 transmits sound signals to the master 10, RX slot is used to transmit the sound signals to the master 10. In other words, in the conventional technology, to avoid that the sound becomes on and off in the transmission, the SCO channel distributes TX slots and RX slots for transmitting sound signals at set intervals, and the TX slots and the RX slots appear in pairs, and the packet length thereof is the same. However, users do not continuously speak in an actual communication. That is, when no sound signal needs to be transmitted, the SCO channel still distributes TX slots and RX slots with fixed frequency for transmitting sound signals. Although the above method keeps a good communication quality, the transmission bandwidth is quietly wasted.

The specification after the Bluetooth technology BT 1.2 develops enhance synchronous connection oriented (ESCO) channel. After ESCO channel is established online, users can readjust the period when TX slots and the RX slots appear in pairs. However, the ESCO channel only can prolong the period to 254 slots. In other words, the TX slots and RX slots must appear once in about 0.15 seconds. In actual application, the bandwidth still will be wasted when no sound signal needs to be transmitted. In addition, the version of BT 1.2 can set the packet length of the TX slots and the RX slots to make the packet length asymmetrical, but the TX slots and the RX slots still must appear in pairs. That is, although two sides do not speak simultaneously, the ESCO channel also distributes the TX slots and the RX slots for transmitting the sound. Meanwhile, one the TX slots and the RX slots become unnecessarily wasted bandwidth. Even when neither of the two sides speaks, it is unnecessary and wastes bandwidth to distribute TX slots and RX slots for transmitting the sound.

BRIEF SUMMARY OF THE INVENTION

The invention provides a Bluetooth bandwidth managing method which adjusts the slot bandwidth of the synchronous connection oriented (SCO) channel by monitoring the intensity of the sound signals to save the Bluetooth transmission bandwidth.

The invention further provides a Bluetooth device which determines whether to release the slot bandwidth of the SCO channel or not by monitoring the intensity of the sound signals to favor the transmission of other data.

The invention provides a Bluetooth bandwidth managing method including establishing SCO channel to connect a remote device and monitoring the intensity of the sound signal. If the intensity is larger than the default value, the slot of the SCO channel is used to transmit the sound signal to the remote device. If the intensity is smaller than the default value, the bandwidth occupied by the slots is released.

In one embodiment of the invention, the above Bluetooth bandwidth managing method includes using sensor to monitor that whether the intensity is larger than the default value, or using the digital signal processor to make a calculation for the sound signal to determine whether the intensity is larger than the default value. The remote device is a master or a slave with the Bluetooth standard. The slot is TX slot or RX slot. If the intensity is larger than the default value, and the bandwidth occupied by the slot is released, the slot is redistributed to transmit the sound signal. When the slot is redistributed, the sound signal is stored in a temporary storage area.

The invention further provides a Bluetooth device including a monitor and a communication circuit. The monitor is used to monitor the intensity of the sound signal. The communication circuit is coupled to the monitor to establish the SCO channel to connect to a remote device. If the intensity is larger than the default value, the slots of the SCO channel are used to transmit the sound signals to the remote device. If the intensity is smaller than the default value, the bandwidth occupied by the slot is released.

In another embodiment of the invention, the remote device is the master of the slave with the Bluetooth standard, and the monitor is a sound sensor. In another embodiment, the monitor is digital signal processor for making a calculation for the sound signal to determine that whether the intensity is larger than the default value. The slots are TX slots or RX slots. If the intensity is larger than the default value, and the bandwidth occupied by the slots are released, the communication circuit redistributes the slots to transmit the sound signals. When the slots are redistributed, the communication circuit stores the sound signals in the temporary storage area.

In the invention, the slot bandwidth of the SCO channel is dynamically released via monitoring the intensity of the sound signal. If the intensity of the sound signal is larger than the default value, the slots of the SCO channel are distributed to transmit the sound signal to the remote device. If the intensity of the sound signal is smaller than the default value, the bandwidth occupied by the slots is released to avoid the waste of the bandwidth.

BENEFICIAL EFFECT

First, the master of the Bluetooth device senses the sound by the monitor. When the intensity of the sound is smaller than the default value, the bandwidth occupied by the TX slot is dynamically released to be used by the ACL channel or RX slot to avoid the waste of the bandwidth.

Second, the master of the Bluetooth device senses the sound by the monitor. When the intensity of the sound is larger than the default value, the TX slot is distributed to the master to transmit the sound signals to the slave, and the appearance frequency, packet length and packet type of the TX slot can be assigned, so that the bandwidth can be utilized effectively.

Third, the slave of the Bluetooth device senses the sound by the monitor. When the intensity of the sound is smaller than the default value, the bandwidth occupied by the RX slot is released dynamically to be used by the ACL channel or the TX slot to avoid the waste of the bandwidth.

Fourth, the slave of the Bluetooth device senses the sound by the monitor. When the intensity of the sound is larger than the default value, the RX slot is distributed to the slave to transmit the sound signals to the master, and the appearance frequency, the packet length and the packet type of the RX slots can be assigned, so that the bandwidth can be utilized effectively.

These and other features, aspects, and advantages of the present invention will become better understood with regard to the following description, appended claims, and accompanying drawings.

DETAILED DESCRIPTION OF THE EMBODIMENTS

Figure 1:
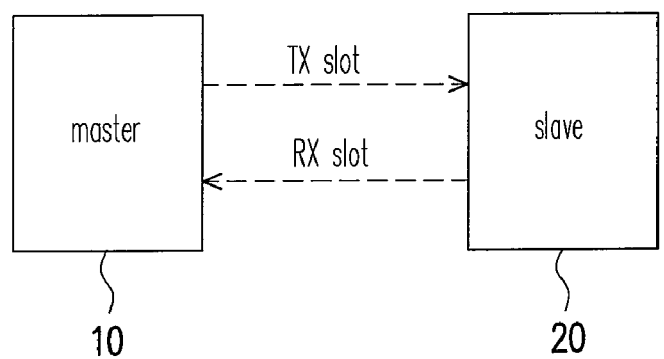
FIG. 1 is a schematic diagram showing a conventional Bluetooth device.
Figure 2:
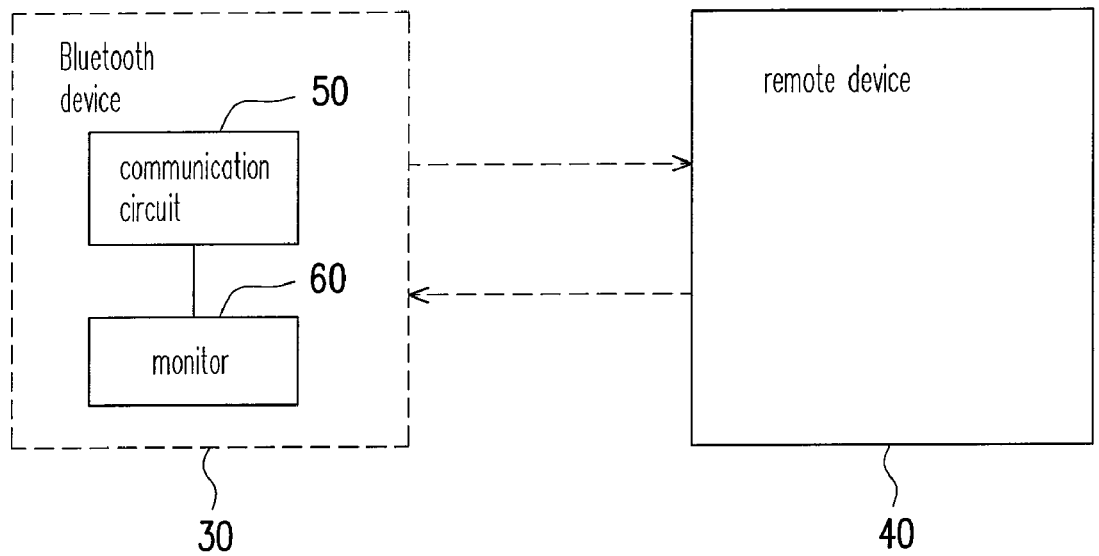
FIG. 2 is a structural diagram showing a Bluetooth device according to a preferred embodiment of the invention.

FIG. 2 is a structural diagram showing a Bluetooth device according to a preferred embodiment of the invention. Please refer to FIG. 2. The Bluetooth device 30 includes a communication circuit 50 and a monitor 60. The Bluetooth device 30 of the embodiment is a master, and a mobile phone is taken for example. People having ordinary skills in the art knows that the "mobile phone" is just an example used in an embodiment, and in another embodiment, the Bluetooth device 30 can be a personal computer, personal digital assistant, notebook and so on, which is not limited in the invention. The communication circuit 50 of the Bluetooth device 30 is used to establish the connection between the synchronous connection oriented (SCO) channel and the remote device 40 (wireless connection). In the embodiment, the remote device 40 is a slave which is, for example, a Bluetooth earphone. The monitor 60 is used to monitor the intensity of the sound signals received from the base station, and then whether the communication circuit 50 releases the bandwidth occupied by the slots of the SCO channel or not is determined. In the embodiment, the monitor 60 is, for example, a digital signal processor (DSP). The various situations in which the slot bandwidth is released are described in detail.

Figure 3:
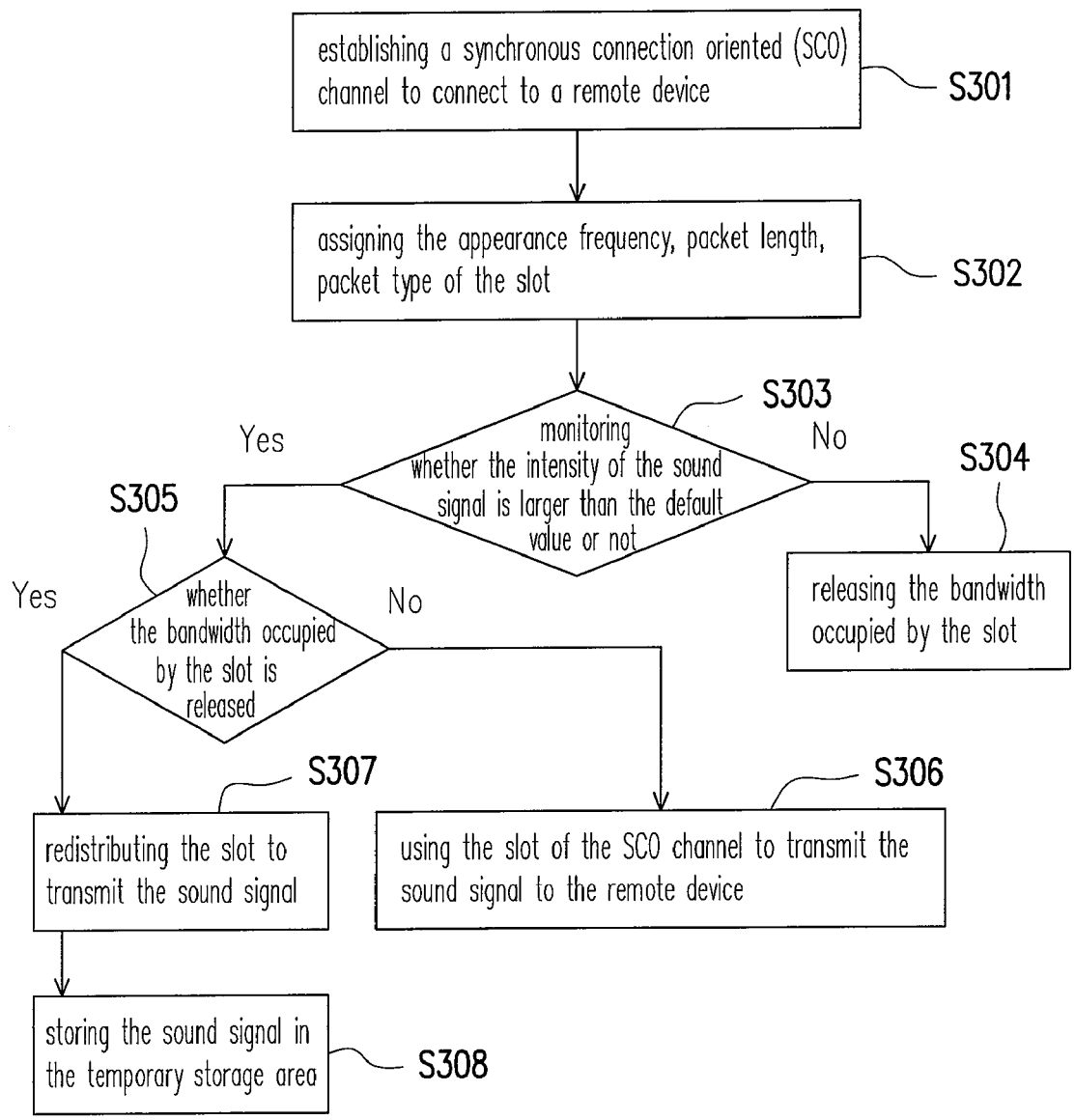
FIG. 3 is a flow chart showing the steps of the Bluetooth bandwidth managing method according to a preferred embodiment of the invention.

FIG. 3 is a flow chart showing the steps of the Bluetooth bandwidth managing method according to a preferred embodiment of the invention. Please refer to FIG. 2 and FIG. 3 simultaneously. The step S301 is executed first. The communication circuit 50 establishes the connection between the SCO channel and the remote device 40. When the SCO channel connects, the SCO channel can provide TX slots for the Bluetooth device 30 to transmit the sound signals received from the base station to the remote device 40, and the appearance frequency, packet length and packet type of the TX slots also can be assigned (step S302). Then, the step S303 follows. The monitor 60 senses that whether the sound signals received by the Bluetooth device 30 from the base station is larger than the default value or not, and the monitor 60 executes a calculation for the sound signals to determine whether the intensity of the sound signals is larger than the default value. For example, the monitor 60 can calculate whether the swings of the sound signals are larger than the default value or make a Fourier transformation to determine whether the intensity of the sound signals is larger than the default value. The advantage of the step S303 is that avoiding the noise caused by the environment noise is regarded as the talk sound by mistake. Therefore, the interference caused by the environment can be avoided.

Follow the above steps. IF the sound signal is smaller than the default value, the step S304 is executed, and the bandwidth occupied by the TX slots is dynamically released via the link manager protocol (LMP) to be used by other transmission, for example, to be used by the ACL channel to transmit data or to be used by the RX slots to transmit the sound signals. On the contrary, if the sound signals are larger than the default value, it means that the base station has talk sound to be transmitted, and therefore examining that whether the TX slots have been released is done (step S305). If the TX slots are not released, the communication circuit 50 uses the TX slots of the SCO channel to transmit the sound signal to the remote device 40 (step S306). On the contrary, if the TX slots have been released, the TX slots are redistributed to transmit the sound signals (step S307).

Figure 4:
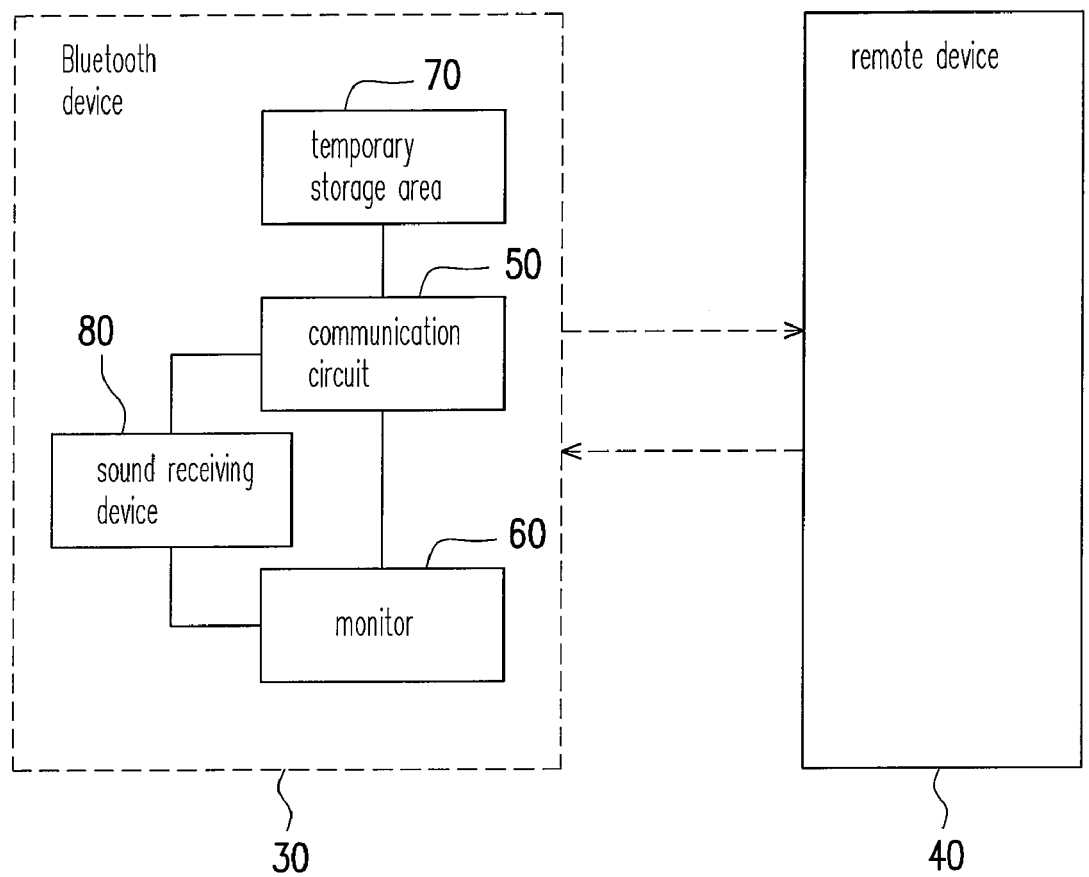
FIG. 4 is a structural diagram showing a Bluetooth device with a temporary storage area according to a preferred embodiment of the invention.

In addition, FIG. 4 is a structural diagram showing a Bluetooth device with a temporary storage area according to a preferred embodiment of the invention. Please refer to FIG. 4. To avoid the situation that the TX slots are distributed for transmission after the Bluetooth device 30 receives the sound, which causes the forepart of the sound signals to be lost, a temporary storage area 70 can be provided to store the sound signals (S308). After the TX slots are established, the sound signals stored in the temporary area 70 are transmitted. In this way, the forepart of the sound can avoid being cut off. People having ordinary skills in the art knows that the temporary storage area 70 can be achieved as a buffer and others, and it is not described in detail for concise purpose.

In another embodiment, the Bluetooth device 30 shown in FIG. 4 also can be a slave and is, for example, a Bluetooth earphone. The monitor 60 of the Bluetooth 30 is a volume sensor and monitors the intensity of the sound signals from the sound receiving device 80 (such as a microphone). The communication circuit 50 is similar with that of the above embodiment and is not described for concise purpose. In the embodiment, the remote device 40 is, for example, a mobile phone. People having ordinary skills in the art knows that the "mobile phone" is just an example in an embodiment, and in another embodiment, the Bluetooth device 30 can be a personal computer, personal digital assistant, notebook and so on, which is not limited in the invention. Users can make a communication by the sound receiving device 80. The monitor 60 can be used to monitor the intensity of the sound signals of the communication of the users, and then, whether the communication circuit 50 releases the bandwidth occupied by the slots of the SCO channel or not is determined. The various situations in which that the slot bandwidth is released are described in detail hereinbelow.

Please refer to FIG. 3 and FIG. 4. The step S301 is executed first. The communication circuit 50 establishes the connection between the SCO channel and the remote device 40. When the SCO channel connects, the SCO channel can provide the RX slots for the communication circuit 50 to transmit the sound signal to the remote device 40, and the appearance frequency, packet length, packet type of the RX slots also can be assigned (step S302). In the following step S303, the monitor 60 senses whether the sound signals of the user is larger than the default value or not. The advantage of the step S303 is that avoiding that the noise caused by the environment noise is regarded as the talk sound by mistake. Therefore, the interference caused by the environment noise can be avoided.

Follow the above steps. If the intensity of the sound signals is smaller than the default value, the communication circuit 50 executes the step S304, and the bandwidth occupied by the RX slots is dynamically released via the link manager protocol (LMP) to be used by other transmission, for example, to be used by the ACL channel to transmit data or to be used by the TX slots to transmit the sound signal. On the contrary, if the sound signals are larger than the default value, it means that the earphone has talk sound to be transmitted, and therefore the communication circuit 50 examines that whether the RX slots have been released or not (step S305). If the RX slots have not been released, the communication circuit 50 uses the RX slots of the SCO channel to transmit the sound signals to the remote device 40 (step S306). On the contrary, if the RX slots have been released, the communication circuit 50 redistributes the RX slots to transmit the sound signals (step S307). To avoid that the RX slot are distributed for transmission after the Bluetooth device 30 receives the sound, which causes the forepart of the sound signals to be lost, a temporary storage area 70 can be used to store the sound signals (S308). After the RX slots are established, the communication circuit 50 transmits the sound signals stored in the temporary area 70. In this way, the forepart of the sound can avoid being cut off. People having ordinary skills in the art know that the temporary storage area 70 can be achieved as a buffer, and it is not described in detail for concise purpose.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for Bluetooth bandwidth managing comprising:
   a Bluetooth device establishing a synchronous connection oriented (SCO) channel to connect to a remote device, wherein a TX slot and a RX slot are reserved when the SCO is established;
   monitoring intensity of a first sound signal which the Bluetooth device received;
   using the TX slot of the synchronous connection oriented (SCO) channel to transmit the first sound signal to the remote device if the intensity of the first sound signal larger than a first default value;
   releasing the bandwidth occupied by the TX slot if intensity of the first sound signal smaller than the first default value;
   monitoring intensity of a second sound signal which the Bluetooth device transmitted;
   using the RX slot of the synchronous connection oriented (SCO) channel to transmit the second sound signal to the remote device if the intensity of the second sound signal larger than a second default value; and
   releasing the bandwidth occupied by the RX slot if intensity of the second sound signal smaller than the second default value.

2. The method according to claim 1 further comprising:
   assigning the appearance frequency and the packet length of the TX slot and the RX slot when the synchronous connection oriented (SCO) channel is established.

3. The method according to claim 2 further comprising:
   assigning packet type of the TX slot and the RX slot when the synchronous connection oriented (SCO) channel is established.

4. The method according to claim 1, wherein the remote device is a master or a slave with the Bluetooth standard.

5. The method according to claim 1 further comprising:
   using a sensor to monitor whether the intensity of the first sound signal is larger than the first default value or not and monitor whether the intensity of the second sound signal is larger than the second default value or not.

6. The method according to claim 1 further comprising:
   using a digital signal processor to make a calculation for the first sound signal to determine whether the intensity of the first sound signal is larger than the first default value; and
   using a digital signal processor to make a calculation for the second sound signal to determine whether the intensity of the second sound signal is larger than the second default value.

7. The method according to claim 1 further comprising:
   redistributing the TX slot to transmit the first sound signal if the intensity of the first sound signal is larger than the first default value and the bandwidth occupied by the TX slot is released; and
   redistributing the TX slot to transmit the first sound signal if the intensity of the first sound signal is larger than the first default value and the bandwidth occupied by the TX slot is released.

8. The method according to claim 7 further comprising:
   storing the first sound signal in a first temporary storage area when the TX slot is redistributed; and
   storing the second sound signal in a second temporary storage area when the RX slot is redistributed.

9. A Bluetooth device comprising:
   a monitor for monitoring intensity of a first sound signal which the Bluetooth device received and a second sound signal which the Bluetooth device transmitted; and a communication circuit coupled to the monitor for establishing a synchronous, connection oriented (SCO) channel to connect a remote device, wherein a TX slot and a RX slot are reserved when the SCO is established, wherein if the intensity of the first sound signal is larger than a first default value, the TX slot of the synchronous connection oriented (SCO) channel is used to transmit the first sound signal to the remote device, and if the intensity of the first sound signal is smaller than the first default value, the bandwidth occupied by the TX slot is released, wherein if the intensity of the second sound signal is larger than a second default value, the RX slot of the synchronous connection oriented (SCO) channel is used to transmit the second sound signal to the remote device, and if the intensity of the second sound signal is smaller than the second default value, the bandwidth occupied by the RX slot is released.

10. The Bluetooth device according to claim 9, wherein when the communication circuit establishes the synchronous connection oriented (SCO) channel, appearance frequency and packet length of the TX slot and the RX slot are assigned.

11. The Bluetooth device according to claim 10, wherein when the communication circuit establishes the synchronous connection oriented (SCO) channel, the packet type of the TX slot and the RX slot is assigned.

12. The Bluetooth device according to claim 9, wherein the remote device is a master or a slave with the Bluetooth standard.

13. The Bluetooth device according to claim 9, wherein the monitor is a sound sensor.

14. The Bluetooth device according to claim 9, wherein the monitor is a digital signal processor and makes an calculation for the first sound signal to determine whether the intensity of the first sound signal is larger than the first default value and for the second sound signal to determine whether the intensity of the second sound signal is larger than the second default value.

15. The Bluetooth device according to claim 9, wherein if the intensity of the first sound signal is larger than the first default value and the bandwidth occupied by the TX slot is released, the communication circuit redistributes the TX slot to transmit the first sound signal, wherein if the intensity of the second sound signal is larger than the second default value and the bandwidth occupied by the RX slot is released, the communication circuit redistributes the RX slot to transmit the second sound signal.

16. The Bluetooth device according to claim 15, wherein when the TX slot is redistributed, the communication circuit stores the first sound signal in a first temporary storage area, wherein when the RX slot is redistributed, the communication circuit stores the second sound signal in a second temporary storage area.

* * * * *